(12) United States Patent
Wells

(10) Patent No.: US 6,744,473 B2
(45) Date of Patent: Jun. 1, 2004

(54) EDITING AND SWITCHING OF VIDEO AND ASSOCIATED AUDIO SIGNALS

(75) Inventor: Nicholas Dominic Wells, East Sussex (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/451,082

(22) Filed: Nov. 30, 1999

(65) Prior Publication Data

US 2002/0047937 A1 Apr. 25, 2002

Related U.S. Application Data

(63) Continuation of application No. PCT/GB98/01574, filed on May 29, 1998.

(51) Int. Cl.$^7$ .............................................. H04N 9/475
(52) U.S. Cl. ...................... 348/515; 348/512; 348/518; 348/423.1; 348/425.4
(58) Field of Search ................................ 348/515, 512, 348/500, 518, 705, 722, 423.1, 425.4; 386/54, 61, 71; 375/354; 370/509; H04N 9/475

(56) References Cited

U.S. PATENT DOCUMENTS

| | | | |
|---|---|---|---|
| 5,243,424 A | 9/1993 | Emmett ...................... 358/143 | |
| 5,387,943 A | 2/1995 | Silver ......................... 348/512 | |
| 5,570,372 A | 10/1996 | Shaffer | |
| 5,598,352 A | * 1/1997 | Rosenau et al. ............. 348/512 | |
| 5,771,075 A | * 6/1998 | Rim et al. ................... 348/512 | |
| 5,784,119 A | * 7/1998 | Noda et al. .................. 348/512 | |
| 5,815,634 A | * 9/1998 | Daum et al. ................. 348/515 | |
| 6,038,000 A | * 3/2000 | Hurst, Jr. ..................... 348/845 | |
| 6,088,063 A | * 7/2000 | Shiba ........................... 348/515 | |
| 6,181,383 B1 | * 1/2001 | Fox et al. ..................... 348/515 | |

FOREIGN PATENT DOCUMENTS

| | | |
|---|---|---|
| EP | 0 648 056 | 4/1995 |
| EP | 0 776 134 | 5/1997 |
| GB | 2 273 215 | 6/1994 |

OTHER PUBLICATIONS

"Switching Facilities in MPEG–2: Necessary But Not Sufficient", by Merrill Weiss, SMPTE Journal, vol. 104, No. 12, Dec. 1, 1995, pp. 788–802.

INSPEC International Broadcasting Convention IBC '94, IEE, London, "Maintaining audio & video synchronisation in television", Kirby et al.

* cited by examiner

*Primary Examiner*—Michael H. Lee
*Assistant Examiner*—Jean W. Désir
(74) *Attorney, Agent, or Firm*—McDermott, Will & Emery

(57) ABSTRACT

To maintain lip-sync when a video signal has been edited or switched at a video frame boundary, the associated audio signal is advanced or retarded to the closest audio frame boundary. Any error introduced by this constraint is accumulated and carried forward to direct subsequent advance or retard decision. In this way, the cumulative error can be kept within an acceptable tolerance.

10 Claims, 2 Drawing Sheets

Figure 1: Examples of switching audio at frame boundaries (Audio frame period = 24 ms)

a) Bitstream A (co-timed with video A)
    b) Bitstream B (co-timed with video B)
    c) Switched bitstream with Audio B advanced
    b) Switched bitstream with Audio B delayed

EDITING AND SWITCHING OF VIDEO AND ASSOCIATED AUDIO SIGNALS

REFERENCE TO RELATED APPLICATION

This Application is a continuation of International Application No. PCT/GB98/01574, whose international filing date is May 29, 1998, which in turn claims the benefit of British Patent Application No. 9711313.8, filed May 30, 1997, the disclosures of which Applications are incorporated by reference herein. The benefit of the filing and priority dates of the International and British Applications is respectfully requested.

FIELD OF THE INVENTION

This invention relates to the editing and switching of digital television signals consisting of video and associated sound components. It is particularly relevant to systems which handle the audio component in compressed form.

BACKGROUND OF THE INVENTION

The component parts of the TV signal necessarily carry with them information which enables their relative replay/display timing to be maintained. However, if for any reason, the replayed/displayed audio/video timings get out of step then this is most noticeable when people are speaking. Consequently, an error in audio/video replay/display timings is often referred to as "lip-sync error".

A variety of techniques have been proposed for maintaining lip-sync in circumstances where the video and audio components have undergone separate processing with the introduction of different delays. Reference is directed, for example, to GB-B-2 273 215 which discloses a technique by which a delay signal is associated with either the video or audio signal, that delay signal representing the relative delay between video and audio. Signal processing elements which introduce delay are provided with synchronizing units which read the delay signal at the input, add or subtract the appropriate delay interval and insert the modified delay signal at the output. At the end of a signal processing chain, the delay signal is read and the appropriate delay interval is inserted. Since there is usually more signal processing conducted on the video component, the greater delay will usually be suffered by the video signal. The compensating delay at the end of the signal processing chain is typically an audio delay only If a video delay is required, GB-B-2 273 215 explains that this can only be adjusted in coarse steps in order to maintain synchronization between its input and output. An additional audio delay will then be used to restore precise synchronization.

The present invention recognizes that in a number of key applications, the audio signal itself will be arranged in discrete frames having a defined time interval. It will no longer be possible in such applications to achieve precise synchronization—to any desired level of accuracy—through coarse frame-by-frame control of video delay and fine, continuous control of audio delay. The prior art proposals, when audio processing is necessarily organised into discrete audio frame intervals, will enable synchronization to be achieved only to within the resolution of one audio frame. The time intervals of audio frames—as will later be discussed in more detail—are considerably shorter than video frames and a lip-sync error of a fraction of an audio frame time interval may not be objectionable. The difficulty Is that the effect of such sub-frame synchronization errors is cumulative and conventional equipment may still produce objectionable lip-sync errors even if every delay within the chain has been defined within the accuracy of one audio frame.

SUMMARY OF THE INVENTION

It is an object of the present invention to provide improved methods for use in editing, switching and like signal processing of temporally associated frame-based signals, which address this problem.

It is a further object of this invention to provide improved methods for use in editing, switching and like signal processing where sub-frame synchronization errors are controlled or managed.

Accordingly, the present invention consists in one aspect in a method for use in the editing and switching of video and associated audio signals in which editing and switching of a video signal is constrained to video frame boundaries and editing and switching of an audio signal is constrained to audio frame boundaries, wherein accumulated sub-frame synchronization error information is carried forward.

Preferably, accumulated sub-frame synchronization error information is employed to direct a frame advance/retard decision in a frame accurate synchronization process.

Suitably, said advance/retard decision operates on audio frames.

Advantageously, accumulated sub-frame synchronization error information is used to keep the total sub-frame synchronization error introduced by the cascading of processing stages within certain tolerances.

In another aspect, the present invention consists in a method for use in editing, switching and like signal processing of temporally associated frame-based signals, in which steps are taken to ensure frame accurate synchronization, characterized in that sub-frame synchronization error feedback is provided to minimize cumulative sub-frame synchronization error.

In yet another aspect, the present invention consists in a method for use in editing, switching and like signal processing of temporally associated frame-based signals which are provided in digital form with information prescribing the time of presentation of frames, characterized by the maintenance through said processes of signal synchronization information, independent of said information prescribing the time of presentation of frames.

BRIEF DESCRIPTION OF THE DRAWINGS

The invention will now be described by way of example with reference to the accompanying drawings, in which.

DETAILED DESCRIPTION OF THE INVENTION

When digital audio is compressed, the compressed audio data is usually organized into "audio frames". For example, in MPEG2 Layer II audio coding, the audio frames are 24 ms long.

When switching/editing such audio data it may be important to switch between source audio clips at times coincident with audio frame boundaries (for example in order to avoid or minimize the build up of re-quantisation noise). If this is the case then, when switching/editing video and associated audio signals it is unlikely that it will be possible to maintain continuity and regularity of video frames and simultaneously maintain continuity and regularity of audio frames without introducing some lip-sync error after the switch/edit point This is because the video frame period and the audio frame period are not equal or related in a very simple fashion.

Figure 1:
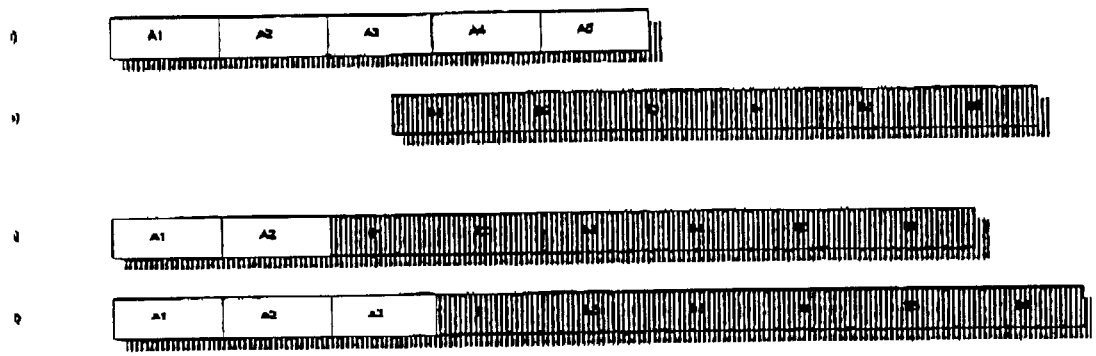
FIG. 1 is a block diagram illustrating the synchronization of frame based audio signals.

For the MPEG Layer II example the maximum lip-sync error introduced at a switch/edit point could be up to +/−12 ms as shown in FIG. 1.

Along the process of programme production, continuity switching and distribution, the signal may be switched and edited several times, and successive errors could accumulate to an unacceptable value. Therefore, some mechanism is required to prevent the build up of lip-sync errors through successive generations of editing/switching. This mechanism is in addition to other mechanisms which may be employed to ensure the overall audio/video synchronization at points along the combined signal chain.

Coded digital audio frames usually contain bytes for signalling framing information together with Information as to how to decode that audio frame, Also, there are usually slots In the audio frame which can be used to carry user-specified data.

The proposed solution to the lip-sync error problem is to use some of these user-specified data bytes to signal the lip-sync error introduced by an edit switch process. At each edit switch process in the production and distribution chain, any equipment performing a switch can read the existing value in the lip-sync field and decide whether to delay or advance the switched audio (by including or removing one extra audio frame) such that the overall lip-sync error is minimized after the new switch edit point. Following the switch point the equipment should re-insert the new value for the total lip-sync error in the lip-sync error field.

For the example of MPEG Layer II switching and editing, this technique would enable the total lip-sync error to be kept within +/−12 ms. Some systems may be defined which switch on sub-frame boundaries (e.g. at 8 ms intervals), but this technique would still be important to prevent unacceptable accumulation of lip-sync errors.

It should be noted that compressed bitstreams such as those defined by the MPEG standard contain information, called Presentation Time Stamps (PTS), which instruct a decoder at what time a given audio or video frame should be replayed/displayed. It is intended that this PTS information is the means by which the audio and video should be replayed/displayed in synchronism at the output of a decoder. However, in situations such as that described by FIG. 1, the decoder is being instructed by the audio PTS values to decode the audio with a possible lip-sync error. It is not possible to simply change the audio PTS values for the audio frames following a switch point because this would lead to a discontinuity in the decoded audio signal.

For audio (and video) editing systems, the audio/video signal is replayed from disk according to an edit list or a playout list. In this case, the audio/video replay/display timing of any particular audio/video frame is specified through the edit list rather than via PTS values. In switching between separate audio source clips, the requirement for continuity of audio frames will inevitably lead to lip-sync errors as shown in FIG. 1.

In summary therefore, editing/switching equipment should perform the following operations around each edit/switch point:

i) Note the time at which an audio frame should be replayed in order to maintain synchronism with the associated video. (This information might come from synchronization information carried in the bitstream or from an edit list).

ii) Read the lip-sync-error field.

iii) In order to maintain continuity of audio frames (or some sub-multiple of the audio frame period), decide whether to advance or delay the following sequence of audio frames in a manner which minimizes the accumulated lip-sync error.

iv) Re-insert in the each frame of the audio a new value corresponding the new accumulated lip-sync error.

Figure 2:
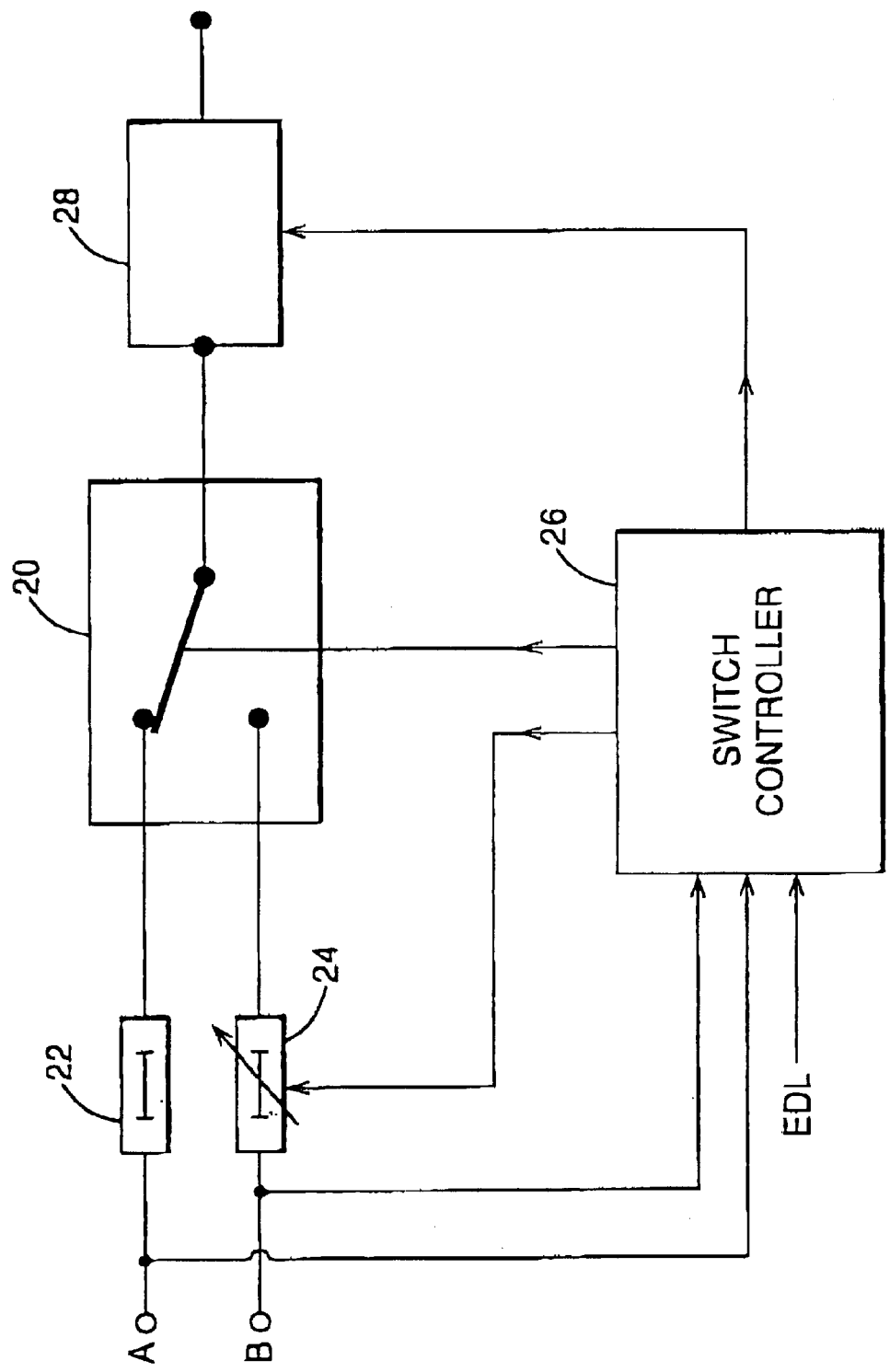
FIG. 2 is a block diagram illustrating apparatus performing a method according to one embodiment of this invention.

Referring now to FIG. 2, an audio switch 20 receives audio signal A through fixed delay 22 and audio signal B through variable delay 24. A switch controller 26 receives an Edit Decision List (EDL) prescribing in this case the desired point of switching from A to B. The switch controller additionally receives audio signal A, from which it determines the frame timings, and audio signal B, from which it determines the current accumulated sub-frame synchronization error. Utilising this information, the switch controller decides whether to advance or retard signal B at the switch point, as illustrated in FIG. 1. To enable signal B to be effectively advanced or retarded, a fixed delay is inserted in the path of signal A and the switch controller selects the appropriate value for the variable delay in the path of signal B. A residual sub-frame synchronization error is calculated and provided as an output for optional embedding in the switched output through embedder 28.

If will be recognised that for simplicity, apparatus has been shown which is capable of switching from signal A to signal B only; a symmetrical version of the described apparatus would also permit switching from signal B to signal A.

In one project, a TV switching and editing system is being developed which uses compressed MPEG2 coded video and MPEG Layer II coded audio. The audio is stored in the form of Packetised Elementary Streams (PES) with one audio frame per PES packet. The PES packet consists of a header of 40 bytes followed by the bytes of the compressed audio frame data. The header contains 16 bytes of user data. Two bytes of this user data field have been reserved to signal the lip-sync error-in units of 90 kHz clock periods.

In some applications switching may be done using audio signals which have been decoded from previously compressed data. The switched signal may then be re-compressed and/or passed on to equipment which can correct for any lip-sync error. In these cases, it is beneficial to be able to carry lip-sync error information within the decoded audio signal.

Several methods for carrying such data within a decoded audio signal which may be in digital or analogue form have been described in a previous patent application [No. GB 9701616.6].

For decoded audio signals, the concept of audio frame can still be applied. In the decoded domain, an audio frame has a one-to-one correspondence with the relevant audio frame in the compressed domain.

The ideas described in this document can also be applied to the switching and editing of any program related data (PRD) where relative timing of the replay of the PRD signal needs to be maintained to within a given tolerance in relation to other signals in the digital multiplex.

What is claimed is:

1. An improved method of editing or switching of video and associated audio signals in which editing and switching of a video signal is constrained to video frame boundaries and editing and switching of an audio signal is constrained to audio frame boundaries which audio and video frame boundaries are not constrained to be coincident, the improvement method comprising:

reading a lip-sync error field to obtain previous cumulative sub-frame synchronization error information, if available pertaining to accumulated sub-frame synchronization error resulting from previous processing, if any;

determining, using said previous cumulative sub-frame synchronization error information, if available, which of a frame advance or frame retard decision will minimize overall cumulative sub-frame synchronization error resulting from said editing or switching and said previous processing, if any;

directing a frame advance/retard decision based on the result of said determination;

determining new cumulative sub-frame synchronization error information; and writing said new cumulative sub-frame synchronization error to the lip-sync error field.

2. A method according to claim 1, in which said advance/retard decision operates on audio frames.

3. A method according to claim 1, in which accumulated sub-frame synchronization error information is used to keep the total sub-frame synchronization error introduced by the cascading of processing stages within certain tolerances.

4. A method according to claim 3, wherein for an MPEG Layer II signal said error is kept within +/−12 ms.

5. A method according to claim 1, wherein the sub frame synchronization error information is maintained independent of information prescribing the time of presentation of frames.

6. A method according to claim 1, in which accumulated sub-frame synchronization error information is carried as data within compressed audio data.

7. A method according to claim 6, wherein the accumulated sub-frame synchronization information is carried in the digital header of a compressed audio frame.

8. A method according to claim 1, in which accumulated sub-frame synchronization error information is carried as data within a decoded/uncompressed digital or audio signal.

9. Apparatus for editing or switching of video and associated audio signals in which editing and switching of a video signal is constrained to video frame boundaries and editing and switching of an audio signal is constrained to audio frame boundaries, which audio and video frame boundaries are not constrained to be coincident, the apparatus having means for determining the time at which an audio frame should be replayed in order to maintain synchronism with the associated video, by comprising:

means for reading a lip-sync-error field carrying cumulative sub-frame synchronization error information;

means for determining based on the cumulative sub-frame synchronization error information which of a frame advance or frame retard decision will minimize overall cumulative sub-frame synchronization error resulting from said editing or switching and previous processing if any;

means for directing a frame advance/retard decision based on the result of said determination;

means for determining new cumulative sub-frame synchronization error information; and means for writing said new cumulative sub-frame synchronization error to the lip-sync error field.

10. Apparatus according to claim 9, wherein the sub-frame synchronization error information is maintained independent of information prescribing the time of presentation of frames.

* * * * *